(12) United States Patent
Chang et al.

(10) Patent No.: US 8,582,955 B2
(45) Date of Patent: Nov. 12, 2013

(54) METHOD FOR SEARCHING FOR A SCENE IN A VIDEO AND MOBILE DEVICE ADAPTED TO THE METHOD

(75) Inventors: Moon Su Chang, Suwon-si (KR); In Jun Son, Suwon-si (KR); Poong Seok Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 13/334,791

(22) Filed: Dec. 22, 2011

(65) Prior Publication Data

US 2012/0177339 A1    Jul. 12, 2012

(30) Foreign Application Priority Data

Jan. 6, 2011   (KR) .................. 10-2011-0001243

(51) Int. Cl.
*H04N 5/92*    (2006.01)
*H04N 5/783*   (2006.01)

(52) U.S. Cl.
USPC .......................................... 386/248; 386/343

(58) Field of Classification Search
USPC .................... 386/230, 248, 343, 351, 353
See application file for complete search history.

(56) References Cited

U.S. PATENT DOCUMENTS

| 6,631,522 B1* | 10/2003 | Erdelyi ........................ 725/53 |
| 2007/0035652 A1 | 2/2007 | Toyoda et al. |
| 2007/0198111 A1 | 8/2007 | Oetzel et al. |
| 2008/0101769 A1 | 5/2008 | Lee |
| 2010/0088634 A1 | 4/2010 | Tsurata et al. |
| 2010/0231534 A1 | 9/2010 | Chaudhri et al. |

FOREIGN PATENT DOCUMENTS

| EP | 2 088 502 A2 | 8/2009 |
| JP | 2002-262240 A | 9/2002 |
| JP | 2003-333537 A | 11/2003 |
| JP | 2006-303635 A | 11/2006 |
| KR | 10-2008-0038893 A | 5/2008 |
| WO | 2006/048028 A1 | 5/2006 |

* cited by examiner

*Primary Examiner* — Robert Chevalier
(74) *Attorney, Agent, or Firm* — Jefferson IP Law, LLP (57) ABSTRACT

A method and mobile device for searching for a scene in a video are provided. The mobile device includes an input unit having a touch panel, a display panel, and a controller. The input unit creates an input signal for reproducing video content. The display panel displays a scene-searching bar for searching for a particular scene in the video content. The controller displays, when a first touch event occurs on the scene-searching bar displayed on the touch panel, an enlarged scene-searching bar that has the same length as the scene-searching bar and a shorter time range for searching for a scene in the video content than the time range of the scene-searching bar.

19 Claims, 4 Drawing Sheets

METHOD FOR SEARCHING FOR A SCENE IN A VIDEO AND MOBILE DEVICE ADAPTED TO THE METHOD

PRIORITY

This application claims the benefit under 35 U.S.C. §119(a) of a Korean patent application filed on Jan. 6, 2011 in the Korean Intellectual Property Office and assigned Serial No. 10-2011-0001243, the entire disclosure of which is hereby incorporated by reference.

BACKGROUND OF THE INVENTION

1. Field of the Invention

The present invention relates to electronic communication systems. More particularly, the present invention relates to a method for easily searching for a scene in a video and a mobile device adapted to the method.

2. Description of the Related Art

The term "mobile device" refers to a type of electronic system that can support a call function with mobility. Mobile devices, which are widely used because they are easily carried and have easy use applications, have a variety of input modes to provide user functions. For example, conventional mobile devices include a touch screen with a touch panel and a display unit. When the user of the mobile device views an image on the display and then makes a gesture to select it, the touch panel can sense the user's gesture. The mobile device creates a touch event corresponding to the user's gesture and then controls an application program to execute the corresponding user function.

Conventional mobile devices are relatively smaller in display area than other devices in order to support mobility. That is, conventional mobile devices display information related to various functions on a relatively small display area. When a video is reproduced, a user has difficulty when searching for a particular scene in the video. If the user misses a particular scene while viewing the video or must terminate the video due to an interruption, the user wants to view the video from the missed scene or the stopped scene. In that case, since mobile devices have smaller display areas, the user must search for the desired video scene via a relatively smaller display area and thus cannot easily find it. Therefore, most mobile device users abandon the process of searching for a desired scene, and instead roughly search for a scene near the desired scene, and then view the video from the nearby scene. This problem frequently occurs when the user is moving with the mobile device. Therefore, when a user does not find the desired video scene, the user must view many scenes again, which causes the user to feel inconvenienced.

SUMMARY OF THE INVENTION

Aspects of the present invention are to address at least the above-mentioned problems and/or disadvantages and to provide at least the advantages described below. Accordingly, an aspect of the present invention is to provide a method for searching for a scene in a video with ease, precision, and rapidity, and to provide a mobile device adapted to the method.

In accordance with an exemplary embodiment of the present invention, a method for searching for a scene in a video is provided. The method includes receiving an input signal for reproducing video content, displaying a scene-searching bar for searching for a particular scene in the video content, and displaying, when a first touch event occurs on the scene-searching bar, an enlarged scene-searching bar that has a length and a shorter time range for searching for a scene in the video content than the time range of the scene-searching bar.

In accordance with another exemplary embodiment of the present invention, a mobile device is provided. The mobile device includes an input unit, including a touch panel, a display panel, and a controller. The input unit creates an input signal for reproducing video content. The display panel displays a scene-searching bar for searching for a particular scene in the video content. The controller displays, when a first touch event occurs on the scene-searching bar displayed on the touch panel, an enlarged scene-searching bar that has the same length as the scene searching bar and a shorter time range for searching for a scene in the video content than the time range of the scene-searching bar.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
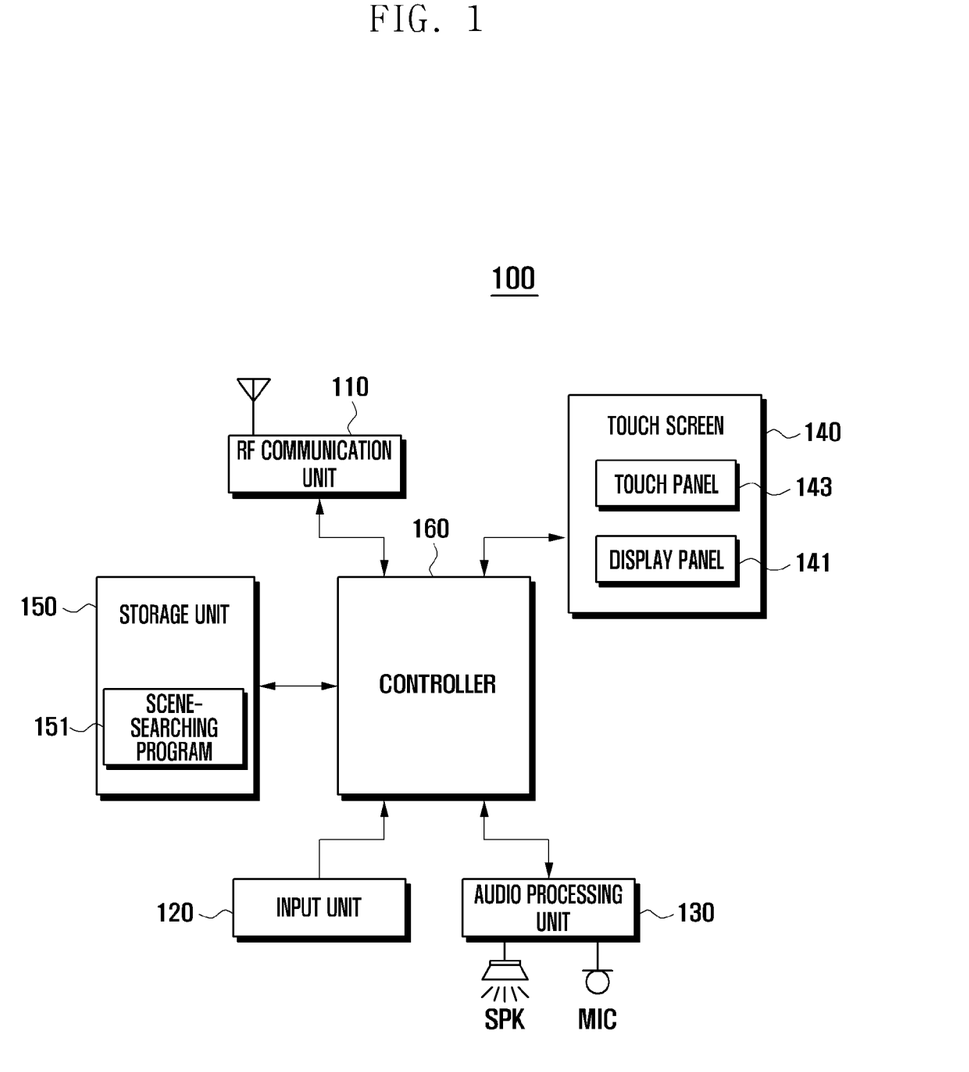
FIG. 1 illustrates a schematic block diagram showing a configuration of a mobile device according to an exemplary embodiment of the present invention.

FIG. 1 illustrates a schematic block diagram showing a configuration of a mobile device according to an exemplary embodiment of the present invention.

Referring to FIG. 1, the mobile device 100 includes a Radio Frequency (RF) communication unit 110, an input unit 120, an audio processing unit 130, a touch screen 140, a storage unit 150 and a controller 160. The touch screen 140 includes a display panel 141 and a touch panel 143.

The mobile device 100 displays a video, stored in the storage unit 150 or received from an external system, on the display panel 141 of the touch screen 140, according to a user's request or preset schedule information. The mobile device 100 also displays, on the display panel 141, a scene-searching bar for searching for a scene in the video according to the user's request or according to a default mode. The user can create a touch event on the scene-searching bar to display an enlarged scene-searching bar or a reduced scene-searching bar, so that he/she can precisely search for a corresponding scene and can also rapidly move to a position where a corresponding search is located. The following description is provided regarding the functions and operations of the components in the mobile device 100 that performs the video scene searching process. The enlarged scene-searching bar may have the same length as the scene-searching bar according to types of touch events that occur on the scene-searching bar displayed on the touch screen. However, the enlarged scene-searching bar sets the range of scene-searching time, smaller than the time range provided by the scene-searching bar, to a time range for searching for a particular scene in video content. Likewise, the reduced scene-searching bar may set the range of scene-searching time, larger than the time range provided by the scene-searching bar, to a time range for searching for a particular scene in video content. In that case, the scene-searching bar has a length equal to or less than that of the reduced scene-searching bar. This configuration allows the mobile device user to perform a more rapid scene searching process via the reduced scene-searching bar. The mobile device 100 can selectively display the enlarged scene-searching bar or the reduced scene-searching bar according to types of touch events that occur on the scene-searching bar. It should be understood that the search bars may be enlarged or reduced relative to each other, which will be described in detail later referring to FIG. 4.

The RF communication unit 110 establishes communication channels with a base station to perform a voice/video call, transmission of data such as videos, messages, etc., under the control of the controller 160. The RF communication unit 110 establishes a voice/video call channel, a data communication channel, etc. with a mobile communication system. To this end, the RF communication unit 110 includes an RF transmitter for up-converting the frequency of signals to be transmitted and amplifying the signals and an RF receiver for low-noise amplifying received RF signals and down-converting the frequency of the received RF signals. More particularly, the RF communication unit 110 establishes a data communication channel with a server or another mobile device and receives video contents via the channel. The mobile device 100 may display the video content received via the RF communication unit 110 on the touch screen 140 in real-time and also store it in the storage unit 150. The mobile device 100 may also download video content via the data communication channel established by the RF communication unit 110 and store it in the storage unit 150. When the controller 160 reproduces the video content received via the RF communication unit 110, it may display a scene-searching bar on the touch screen 140 that allows the user to search for a corresponding scene in the video. The scene-searching bar may be enlarged or reduced according to a touch event that additionally occurs on the touch screen 140.

The input unit 120 includes input keys and function keys that allow the user to input numbers or letters and to set a variety of functions. The function keys include direction keys, side keys, shortcut keys, etc., which are set to perform specific functions. In addition, the input unit 120 creates key signals for setting user options and for controlling functions of the mobile device 100 and transfers them to the controller 160. The input unit 120 can be implemented with a QWERTY keypad, a 3×4 keypad, a 4×3 keypad, etc. Alternatively, the input unit 120 may also be implemented with a QWERTY keypad map, a 3×4 keypad map, a 4×3 keypad map, a menu map, a control key map, etc., which are displayed on the touch screen 140. When the touch screen 140 is implemented with a full touch screen, the input unit 120 may be implemented with side keys installed on the side of the body case of the mobile device 100. In an exemplary embodiment of the invention, the input unit 120 creates signals for outputting/erasing a scene-searching bar according to the user's control. For example, when the input unit 120 creates a signal for outputting a scene-searching bar, the controller 160 displays the scene-searching bar on the touch screen 140 while reproducing video content. The scene-searching bar may be automatically displayed on the display panel 141 when the video starts to be reproduced and disappear after a certain time period has elapsed. The input unit 120 can create a signal for outputting again the scene-searching bar that is removed from the display panel 141 or for removing it, according to the user's request.

The audio processing unit 130 includes a speaker (SPK) and a microphone (MIC). The audio processing unit 130 outputs, via the speaker, audio data that is transmitted/received during the call, included in messages received, or created when an audio file stored in the storage unit 150 is reproduced. The audio processing unit 130 receives, via the microphone (MIC), the user's voice during the call or audio signals. In an exemplary embodiment of the invention, the audio processing unit 130 outputs a sound effect at a time point when a scene-searching bar is displayed on the display panel 141. When touch events occur as the user operates the scene-searching bar, the audio processing unit 130 can also output sound effects corresponding thereto. In another exemplary embodiment, the sound effects related to the scene-searching bar may not be output according to the user's settings.

The touch screen 140 includes a display panel 141 and a touch panel 143, where the touch panel 143 is installed onto the display panel 141. The size of the touch screen 140 is determined by the touch panel 143.

The display panel 141 displays menus of the mobile device 100, and information input by a user or information provided to the user. The display panel 141 provides various types of screens according to the operation of the mobile device 100, such as an idle screen, menu screens, a message writing screen, a call screen, etc. The display unit 141 may be implemented with a Liquid Crystal Display (LCD), an Organic Light Emitting Diode (OLED), or the like. The display panel 141 may be arranged on/under the touch panel 143. While the display panel 141 is displaying a screen related to a variety of user's functions, it can also display a scene-searching bar on one side of the screen, according to the user's request or when video content is reproduced. The scene-searching bar may be displayed on one side of a screen, e.g., the bottom of the screen, where the screen means a screen on which video content is being reproduced or a screen before video content is reproduced. The scene-searching bar may be shaped as a bar type that runs right and left at the bottom of the display panel 141, with a certain width. The scene-searching bar may be altered to be enlarged/reduced according to a user's control, i.e., an enlarged/reduced scene-searching bar. The output of the scene-searching bar or the functions related to the scene-searching bar will be described in more detail later referring to FIG. 4.

The touch panel 143 is arranged on/under the display panel 141. The touch panel 143 creates a touch event according to the touch of an object, e.g., the user's finger, and transfers a signal corresponding to the event to the controller 160. The touch panel 143 includes a number of sensors that are arrayed in a matrix form, and transfers information regarding a location where a touch event occurs and information regarding the type of touch event to the controller 160. In an exemplary embodiment of the invention, when the display panel 141 displays a scene-searching bar on a region, the touch panel 143 creates a first/second touch event for enlarging/reducing the scene-searching bar, according to the user's touch, at the location corresponding to the region of the display panel 141. For example, the first touch event may correspond to a 'right and down drag' gesture and the second touch may be a 'right and up drag' gesture. It should be understood that the first and second touch events may be implemented in various modes according to the mobile device manufacturers' designs or the user's settings. The first touch event refers to a touch event that enlarges a scene-searching bar that is being output and outputs to an enlarged scene-searching bar for searching for scenes in detail for video content. Likewise, the second touch event refers to a touch event that outputs a reduced, scene-searching bar for rapidly moving an approximate position in video content, near a particular scene, with an easy skip of scenes. When the touch panel 143 displays a scene-searching bar, a scene-searching bar that is larger than the scene-searching bar or a scene-searching bar that is larger than the enlarged scene-searching bar, or a scene-searching bar that is smaller than the scene-searching bar, in order to automatically reproduce video content, it also creates a preset event, e.g., a touch event according to a 'right or left drag and release' gesture, at a particular location on which a corresponding searching bar is displayed. The controller 160 reproduces the video content from a touch release position.

The storage unit 150 stores application programs for executing functions according to the invention. The storage unit 150 stores a key map and a menu map to operate the touch screen 140. The key map and menu map can be implemented in various modes. For example, the key map may be a keyboard map, a 3×4 key map, a QWERTY key map, etc. The key map may also be a control key map for controlling an application program that is currently activated. The menu map is used to control an application program that is currently activated. The storage unit 150 includes a program storage area and a data storage area.

The program storage area stores an Operating System (OS) for booting the mobile device 100 and for controlling the entire operation of the components in the mobile device 100. The program storage area also stores application programs that are necessary for other optional functions of the mobile device 100, such as a call function, a web browser for accessing Internet servers, a camera function, an audio playback function (e.g., MP3 files, etc.), an image or video playback function, etc. In an exemplary embodiment of the invention, the program storage area stores a scene searching program 151.

When an event occurs to reproduce video content, the controller 160 executes the scene searching program 151 to output a scene-searching bar for allowing the user to search for a scene in the video content. To this end, the scene searching program 151 includes a number of routines. For example, routines for searching for a request for reproducing video content, for displaying a scene-searching bar on one side of the display panel 141 and setting the touch panel 143 according to the video content reproducing request, for identifying a touch event that occurs on the scene-searching bar displayed on the touch panel 143, and for altering a scene-searching bar to an enlarged/reduced, scene-searching bar or reproducing video content according to types of touch events. The scene searching program 151 may be implemented in the video reproducing application program.

The data storage area stores data created when the mobile device 100 is used, for example, phonebook data, at least one icon according to widget functions, and a variety of contents. The data storage area also stores user's data input via the touch panel 143. More particularly, the data storage area stores information regarding the size of the enlarged region of the enlarged scene-searching bar and the size of the reduced region of the reduced scene-searching bar. The information regarding the size of the enlarged/reduced region is used to determine the range of region to be enlarged or reduced in video content indicated by a scene-searching bar, by applying the process of altering a scene-searching bar. It should be understood that the information regarding the size of the enlarged/reduced region may be altered according to the manufacturers' settings or the user's settings.

The controller 160 controls the supply of electric power to the components in the mobile device 100 and initializes them. The controller 160 determines whether a gesture is created to reproduce video content in the mobile device 100. When the controller 160 ascertains that a gesture for reproducing video content is created, it displays a scene-searching bar on the display panel 141. The controller 160 senses touch events that occur on an area on the touch panel 143 where the scene-searching bar is displayed, and alters the scene-searching bar or reproduces video content according to the touch events. The controller 160 is described in more detail referring to FIG. 2.

Figure 2:
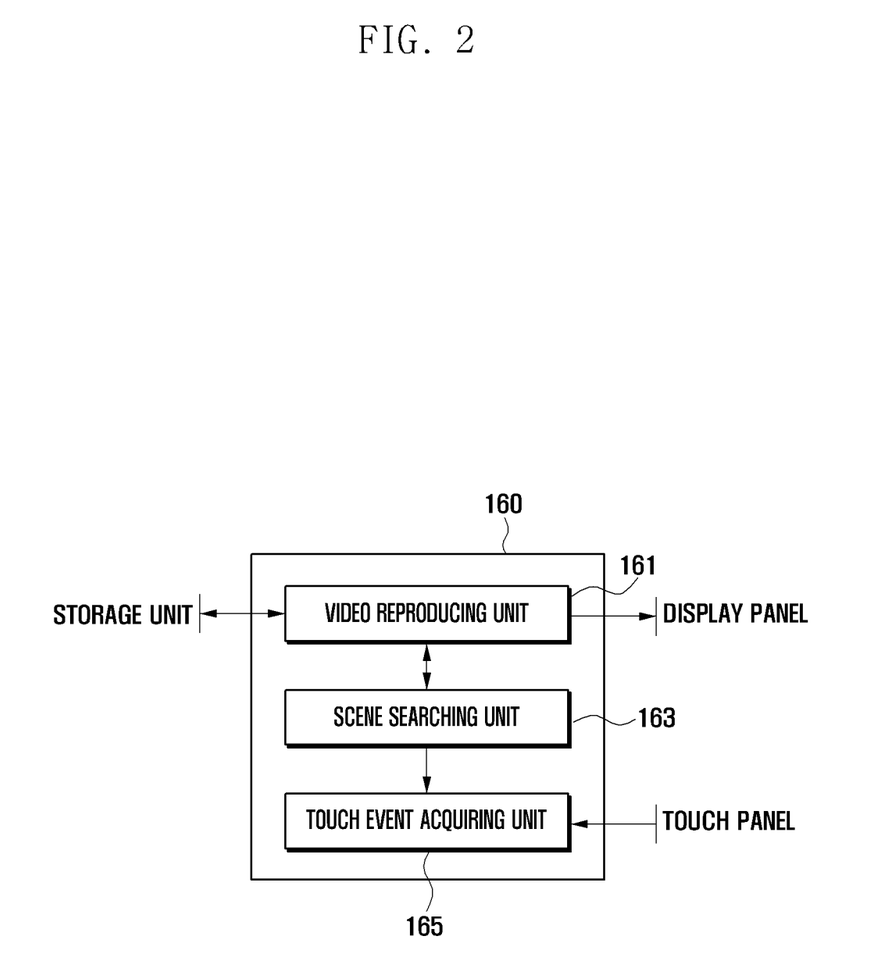
FIG. 2 illustrates a view of the controller shown in FIG. 1 according to an exemplary embodiment of the present invention.

FIG. 2 illustrates a view of the controller shown in FIG. 1 according to an exemplary embodiment of the present invention.

Referring to FIG. 2, the controller 160 includes a video reproducing unit 161, a scene searching unit 163 and a touch event acquiring unit 165.

The video reproducing unit 161 reproduces and displays corresponding video content on the display panel 141 according to a user's request that is created via a signal of the input unit 120 or a touch event of the touch panel 143. The video reproducing unit 161 cooperates with the scene-searching unit 163. When the video reproducing unit 161 receives a signal for searching for a scene from the scene-searching unit 163, it stops reproducing the currently reproduced video according to the signal, or reproduces it rapidly or slowly according to an additional input signal or touch event. More particularly, when the video reproducing unit 161 receives a signal corresponding to a particular touch event from the scene-searching unit 163, it can reproduce the stopped video from a specific scene. The specific scene refers to a scene in the video corresponding to a particular position in the scene-searching bar.

The scene searching unit 163 displays a scene-searching bar on the display panel 141 when the video reproducing unit 161 reproduces a video. When the scene searching unit 163 receives a signal corresponding to a touch event for requesting a scene search from the touch event acquiring unit 165 or a signal for requesting a scene search from the input unit 120, it displays a scene-searching bar on the display panel 141. The scene searching unit 163 also transfers, to the video reproducing unit 161, a signal for leafing through screens to search for a scene in a video that stopped being reproduced, according to a touch event that occurs at a position where the scene-searching bar is displayed. When the first touch event occurs at a particular position in the scene-searching bar or the reduced scene-searching bar, the scene searching unit 163 enlarges the bar and displays the enlarged scene-searching bar on the display panel 141, with respect to the position. The enlarged region of the enlarged scene-searching bar includes a certain period of time with time intervals before and after a time point in the previous scene-searching bar. In addition, the enlarged scene-searching bar may have the same shape as a bar before a scene-searching bar is reduced.

When the second touch event occurs at a particular position in the scene-searching bar or the enlarged scene-searching bar, the scene searching unit 163 reduces the bar and displays the reduced scene-searching bar on the display panel 141, with respect to the position. The reduced region of the reduced scene-searching bar may be a region of a scene-searching bar before the scene-searching bar is enlarged or a region of a scene-searching bar that is reduced at a certain ratio. The enlargement or reduction may include a concept where the time range is enlarged or reduced. The shapes of the enlarged scene-searching bar and the reduced scene-searching bar will be described in detail later referring to FIG. 4.

When a scene-searching bar is displayed, the scene searching unit 163 may display a preview screen corresponding to a position in the scene-searching bar on one side of the display panel 141. For example, the scene searching unit 163 may display preview screens corresponding to a start position and end position of a scene-searching bar that is being displayed on the display panel 141. When a scene-searching bar is altered to an enlarged scene-searching bar or a reduced scene-searching bar and thus the times of reproducing the video at the start and end positions differ from the times of the current scene-searching bar, the display panel 141 displays preview screens corresponding to the altered times. The scene searching unit 163 may automatically set positions in the scene-searching bar between the start and end points of the video, according to the mobile device manufacturers' design or the user's settings, and may display preview screens corresponding to the set positions on the display panel 141.

The touch event acquiring unit 165 acquires touch events that occur on the touch panel 143. The touch event acquiring unit 165 acquires a touch event at a location where a scene-searching bar is displayed, and transfers it to the scene searching unit 163. The touch event acquiring unit 165 also acquires a touch event corresponding to a gesture that selects an icon or menu item or is applied to the touch panel 143 in order to request a scene-search. The touch event acquiring unit 165 also acquires a first/second touch event for outputting an enlarged/reduced scene-searching bar, and transfers it to the scene searching unit 163.

As described above, the mobile device 100 according to the invention allows the user to operate a scene-searching bar according to various types of touch gestures during the reproduction of video content, so that he/she can easily and rapidly search for a corresponding scene in the video content.

Figure 3:
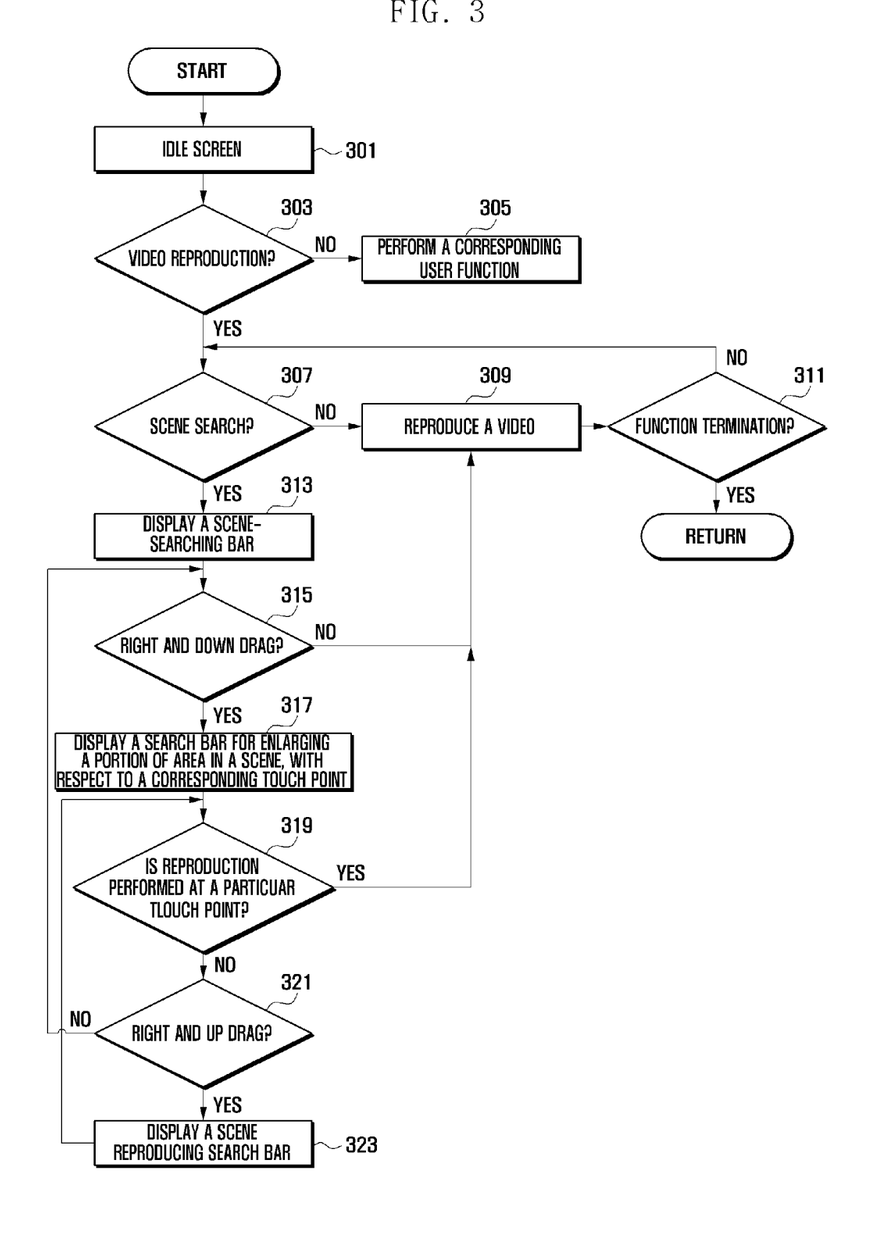
FIG. 3 illustrates a flowchart for searching for a scene in a video, according to an exemplary embodiment of the present invention.

FIG. 3 illustrates a flowchart for searching for a scene in a video, according to an exemplary embodiment of the present invention.

Referring to FIG. 3, when the mobile device 100 is turned on, the controller 160 supplies electric power to the components in the mobile device, initializes them, and outputs an idle screen on the touch screen according to preset schedule information at step 301.

When the controller 160 receives an input signal or senses a touch event, it determines whether it is to reproduce video content at step 303. When the controller 160 ascertains that the input signal or touch event is not to reproduce video content at step 303, it performs a user function corresponding to the input signal or touch event at step 305. Examples of the user function are calling, file-searching, web-accessing, image-acquiring, broadcast-receiving, etc.

On the contrary, when the controller 160 ascertains that the input signal or touch event is to reproduce video content at step 303, it determines whether the input signal or touch event is to search for a scene in the video content at step 307. When the controller 160 ascertains that the input signal or touch event is not to search for a scene in the video content at step 307, it reproduces the video content at step 309. After that, the controller 160 determines whether a signal is input to terminate the function related to the video content at step 311. When the controller 160 ascertains that a signal is not input to terminate the function related to the video content at step 311, it returns to and proceeds with step 307. On the contrary, when the controller 160 ascertains that a signal is input to terminate the function related to the video content at step 311, it returns to a step before step 301.

Meanwhile, when the controller 160 ascertains that the input signal or touch event is to search for a scene in the video content at step 307, it displays a scene-searching bar for searching for a scene on the display panel 141 at step 313. In another exemplary embodiment, when the mobile device 100 is set to perform a scene-searching function when reproducing video content, as a default function, the controller 160 may perform step 313 without performing step 307.

When the scene-searching bar is displayed on the display panel 141, the controller 160 determines whether a first touch event, e.g., a touch event corresponding to a 'right and down drag' gesture, occurs to output an enlarged scene-searching bar at step 315. When the controller 160 ascertains that a first touch event does not occur or a touch event for performing a video scene and reproducing the video, e.g., a 'right drag and release' gesture, occurs at step 315, it returns to and proceeds with step 309. On the contrary, when the controller 160 ascertains that a first touch event occurs at step 315, it displays, on the display panel 141, an enlarged scene-searching bar that is larger than the scene-searching bar with respect to a corresponding touch position at step 317. The enlarged scene-searching bar is created as the previous scene-searching bar is enlarged in time range. Although the enlarged scene-searching bar has the same length as the previous scene-searching bar, it has a different time range displayed on the display panel 141 from that of the previous scene-searching bar, so that the user can more precisely search for a video scene as he/she performs a drag operation on the enlarged scene-searching bar.

After displaying an enlarged scene-searching bar, the controller 160 determines whether an input signal for requesting video content is created at a particular touch position at step 319. When the user creates a drag event on the enlarged scene-searching bar and a touch release event instead of the creation of an up/down event corresponding to first/second touch event at step 319, the controller 160 returns to and proceeds with step 309 where it reproduces a video event from a position where the touch release event has occurred.

On the contrary, when the controller 160 ascertains that the touch event does not correspond to a touch event for reproducing video content at step 319, it determines whether a second touch event, e.g., a touch event corresponding to a 'right and up drag' gesture, occurs to output a reduced scene-searching bar at step 321. When the controller 160 ascertains that the second touch event occurs at step 321, it displays a reduced scene-searching bar on the display panel 141 at step 323. The reduced scene-searching bar corresponds to a bar prior to the enlarged scene-searching bar being enlarged. Although the reduced scene-searching bar is created as a scene-searching bar is reduced in length and accordingly allows for a relatively short movement distance of a drag gesture, a large number of scenes in a relatively long time range can be scrolled. When a scene-searching bar does not indicate the running time of the entire video content, the reduced scene-searching bar allows for a longer time range for searching for a scene than a time range during which a scene can be searched. After displaying the reduced, scene-searching bar at step 323, the controller 160 returns to a step before step 319, where it performs a routine for identifying whether a first/second touch event occurs or a routine for reproducing video content.

On the contrary, when the controller 160 ascertains that the second touch event does not occurs at step 321, it returns to step 315 and determines whether an additional first touch event occurs. When the controller 160 ascertains that an additional first touch event occurs, it enlarges the enlarged scene-searching bar than the previous enlargement at a certain ratio and displays the further enlarged scene-searching bar on the display panel 141. While the scene-searching bar is displayed at steps 317 and 323, the controller 160 may display at least one preview screen corresponding to a certain position of the scene-searching bar on a certain area of the display panel 141.

Although the exemplary embodiment is implemented in such a way that the enlarged scene-searching bar and the reduced scene-searching bar are enlarged and reduced by the same ratio and the enlarged scene-searching bar is reduced in size to the previous scene-searching bar according to the second touch event, it should be understood that the invention is not limited thereto. That is, the ratios of enlargement and reduction of the scene-searching bar may differ from each other according to the manufacturers' design or the user's settings. In that case, the method according to the invention can also be implemented in such a way that, although a number of first touch events are performed to repeatedly enlarge a certain area of the scene-searching bar, the enlarged scene-searching bar can be returned to the original scene-searching bar according to the second touch event once.

As described above, the video scene searching method and the mobile device adapted to the method, according to the invention, can allow the user to rapidly and easily search for a scene to be reproduced in video content, and also to rapidly and easily re-search a missed scene during the reproduction of the video content.

Figure 4:
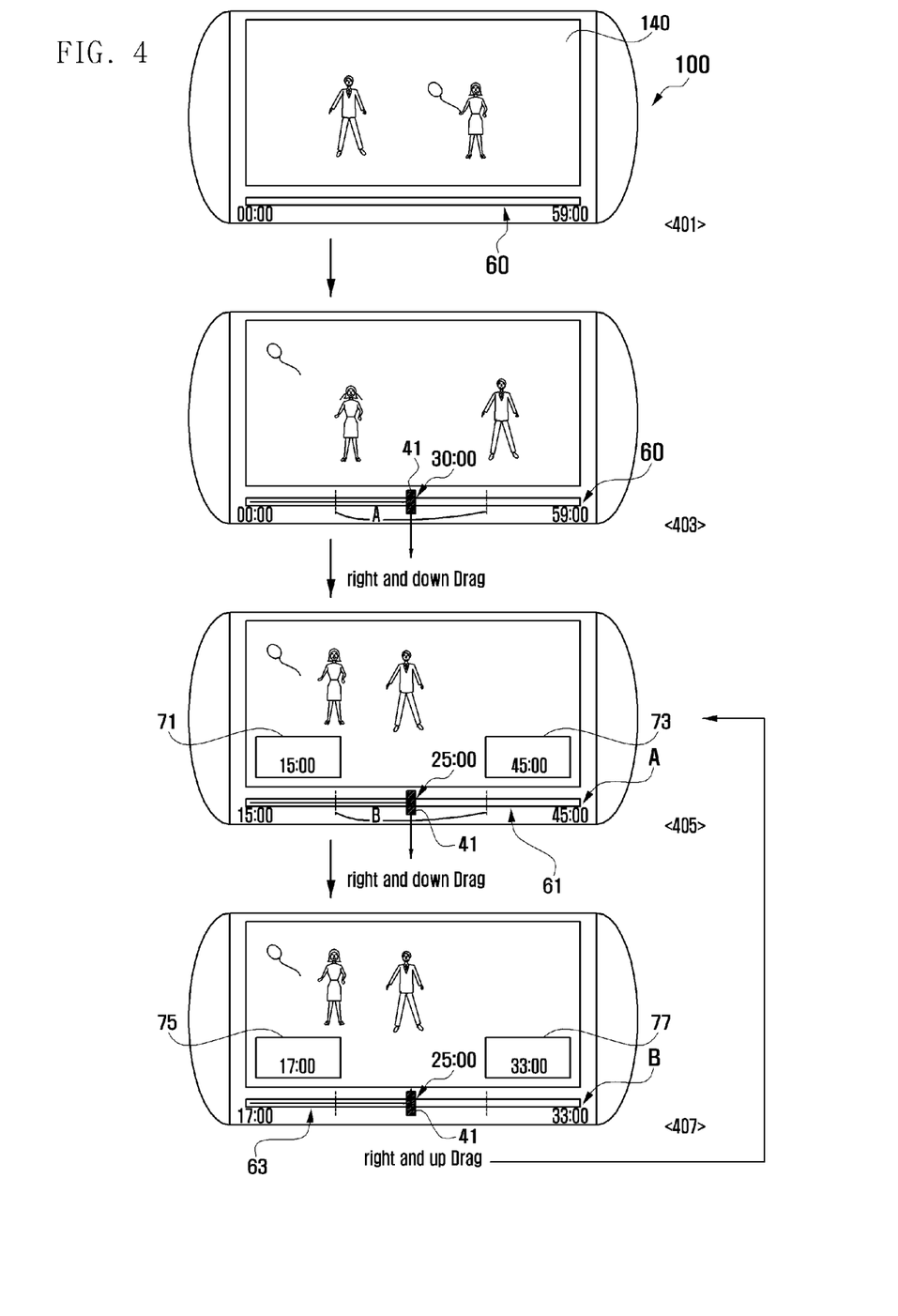
FIG. 4 illustrates screens that describe the video scene-searching method according to an exemplary embodiment of the present invention.

FIG. 4 illustrates screens that describe the video scene searching method according to an exemplary embodiment of the present invention. In the following description, for the sake of convenience, the touch gestures are performed by the user's fingers.

Referring to FIG. 4, the mobile device 100 reproduces video content stored in the storage unit 150 and displays it on the display panel 141 of the touch screen 140, according to the user's request. As shown in diagram 401, the mobile device 100 displays a scene-searching bar 60 with a certain length on one side of the screen, e.g., at the bottom of the display panel 141. The scene-searching bar 60 is shaped to have a width and a length and is displayed on one side of the display panel 141. The scene-searching bar 60 is also displayed with information regarding video running time points at certain areas, e.g., 00:00 min and 59:00 min; at start and end points respectively. The mobile device 100 displays a screen corresponding to the screen before reproducing video content, e.g., a representative image of video content, on the display panel 141.

When the user creates a touch drag event on the scene-searching bar 60 displayed on the touch panel 143, the mobile device 100 displays, on the display panel 141, video screens corresponding to a location of the bar where the event has occurred as shown in diagram 403. The scene-searching bar 60 displays a search indicator 41 thereon to represent where the touch drag is located. The user performs a drag gesture on the scene-searching bar 60 to the right or left in order to search for a corresponding scene. Alternatively, as shown in the diagrams, when the search indicator 41 is located at a particular position on the scene-searching bar 60, a particular touch event, e.g., an event according to a 'down drag,' may be created. That is, the user can perform a 'right and down drag' on the scene-searching bar 60.

In that case, the mobile device 100 displays a first enlarged scene-searching bar 61 on the screen, as shown in diagram 405, which is based on a first time range, A, i.e., both time intervals before and after the search indicator 41 as shown in diagram 403. The first enlarged scene-searching bar 61, as shown in diagram 405, is created by enlarging the first time, A, of a previous scene-searching bar 60. That is, when a first touch event occurs to display a first enlarged scene-searching bar 61 at a time point that the search indicator 41 indicates the video running time point '30:00 min' as shown in diagram 403, the mobile device 100 displays the first enlarged scene-searching bar 61 including the first time range, A, before and after the search indicator 41, e.g., respective 15:00 mins. The total scene-searching time of the scene-searching bar 60 displayed on the display panel 141 is 59 mins as shown in diagram 403. However, the total scene-searching time of the first enlarged scene-searching bar 61 displayed on the display panel 141 is 30 mins including respective time intervals, 15 mins, before and after the video running time point 30 min as shown in diagram 405.

While displaying a first enlarged scene-searching bar 61 on the screen as shown in diagram 405, the mobile device 100 can display, on one side of the display panel 141, preview screens 71 and 73 corresponding to positions in the first enlarged scene-searching bar 61. For example, the mobile device 100 can display, on the left of the display panel 141, a first preview screen 71 corresponding to a video running time point, 15:00 min, corresponding to the start point of the first enlarged scene-searching bar 61. Likewise, the mobile device 100 can display, on the right of the display panel 141, a second preview screen 73 corresponding to a video running time point, 45:00 min, corresponding to the end point of the first enlarged scene-searching bar 61. The first 71 and second 72 preview screens may include information regarding time points located in a first enlarged scene-searching bar 61.

The mobile device user can search for a scene in the video content by applying a touch drag to the first enlarged scene-searching bar 61 displayed on the screen as shown in diagram 405. In that case, the mobile device 100 displays a search indicator 41 on the first enlarged scene-searching bar 61, so that the user can view his/her search point. When the user needs to enlarge the first enlarged scene-searching bar 61 during the scene-searching process, he/she creates a first touch event, i.e., a down drag' gesture, at the position where the search indicator 41 is located on the screen as shown in diagram 405, and alternatively may conduct a 'right and down drag' gesture to achieve the process in one step.

On the other hand, the mobile device 100 can display, on one side of the screen as shown in diagram 407, a second enlarged scene-searching bar 63 including a second time range, B, i.e., both time intervals before and after the search indicator 41 as shown in diagram 405. For example, the mobile device 100 displays the second enlarged scene-searching bar 63 where a second time range including respective time intervals, i.e., 8 mins, before and after the search indicator 41, i.e., the video running time point 25 min, is enlarged. During this process, the mobile device 100 can display, on one side of the display panel 141, preview screens 75 and 77 corresponding to positions in the second enlarged scene-searching bar 63, e.g., the start point of the video running time point 17:00 min and the end point of the video running time point 33:00 min.

When the user creates a second touch event, via a 'right and up drag' gesture for example, on a certain position on the second enlarged scene-searching bar 63 to display a reduced scene-searching bar, the mobile device 100 may display a scene-searching bar where the time interval is reduced with respect to a position where the search indicator 41 is located. For example, when the search indicator 41 is located at the video running time point '25:00' min on the second enlarged scene-searching bar 63 and the user performs an 'up drag' gesture, the mobile device 100 returns the current scene-searching bar to the first enlarged scene-searching bar 61 as shown in diagram 405.

When the user performs an 'up drag' gesture in a state where the search indicator 41 indicates the video reproducing time 20:00 min, the mobile device 100 displays, on the display panel 141, a reduced scene-searching bar that is created by a time range including intervals before and after the video reproducing time 20:00, e.g., the time point 4:00 min as a video reproducing start time point and 36 min as a video reproducing end time point. The reduced scene-searching bar is created by reducing a scene-searching bar by the same ratio as it is previously enlarged or according to a preset ratio of reduction. More particularly, when the enlargement of a scene-searching bar is repeatedly performed, the ratio of enlargement is correspondingly applied to the scene-searching bar.

As described above, the video scene searching method and the mobile device adapted to the method according to the invention can display a scene-searching bar that allows the user to search for a corresponding scene in video content. When a first touch event occurs on the scene-searching bar, an enlarged scene-searching bar is displayed that has the same length as the scene-searching bar and a smaller time range for searching for a scene than the scene-searching bar has. In addition, when the first touch events occur repeatedly in a state where the enlarged scene-searching bar is being displayed, a further enlarged scene-searching bar, i.e., a second enlarged scene-searching bar, is displayed that has the same length as the previous enlarged scene-searching bar has and has a smaller time range than the previous enlarged scene-searching bar.

When a second touch event occurs that differs from the first touch event, a reduced scene-searching bar is displayed that has a longer time range for searching for a scene in the video content than the scene-searching bar, the enlarged scene-searching bar or the further enlarged scene-searching bar has and has a length equal to or shorter than the scene-searching bar, the enlarged scene-searching bar or the further enlarged scene-searching bar.

As described above, since the video scene searching method and the mobile device adapted to the method according to the invention can alter the time range of a scene-searching bar according to the number of touch events that the user creates, the user can easily and rapidly search for a corresponding scene in the video content.

Although the exemplary embodiment is implemented in such a way that an enlarged/reduced scene-searching bar is displayed when a right drag gesture is performed and an up or down drag is performed, it should be understood that the invention is not limited thereto. For example, the video scene searching method may display a scene-searching bar that is enlarged or reduced according to various types of touch events. When the user performs a drag gesture right and left on the scene-searching bar, the enlarged scene-searching bar, the further enlarged scene-searching bar, or the reduced scene-searching bar, and retains the touch down gesture, the mobile device 100 can display, on a region on the display panel 141, near the touch down location, text information that includes a touch mode guideline to guide the user to perform an 'up drag' gesture for displaying a reduced scene-searching bar or a 'down drag' gesture for displaying an enlarged scene-searching bar.

As described above, the video scene searching method and the mobile device adapted to the method, according to exemplary embodiments of the invention, can search for a scene in a video with ease, precision, and rapidity, thereby reducing the time required for searching for a scene in a video, compared to the conventional scene searching system.

Although it is not shown in the drawings, the mobile device 100 according to exemplary embodiments of the invention may selectively further include various types of components, for example: a short-range communication module for short-range communication; a camera module for acquiring still images/videos; an interface for transmitting/receiving data in a wireless or wired mode; an Internet communication module; and a digital broadcast module for receiving and reproducing broadcasts. With the spread of digital convergence, although the types of the mobile device 100 are too various to list their modifications in this description, it will be easily appreciated by those skilled in the art that the other components equivalent to the above-listed components may be further included to the mobile device 100 according to the invention. Also, it will be appreciated that, according to the purposes, the mobile device may be implemented by omitting a particular component or replacing it with other components.

The mobile device 100 according to exemplary embodiments of the invention includes all information communication devices, multimedia devices, and their applications, which can supply touch panels and operate according to communication protocols corresponding to various types of communication systems. For example, the mobile device 100 can be applied to mobile communication terminals, Portable Multimedia Players (PMPs), digital broadcast players, Personal Digital Assistants (PDAs), audio players (e.g., MP3 players), mobile game players, smartphones, laptop computers, handheld PC, etc.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for searching for a scene in a video, the method comprising:
   receiving an input signal for reproducing video content;
   displaying a scene-searching bar for searching for a particular scene in the video content;
   displaying, when a first touch event occurs on the scene-searching bar, an enlarged scene-searching bar that has a same length as the scene-searching bar and a shorter time range for searching for a scene in the video content than the time range of the scene-searching bar; and
   displaying, when the first touch event is retained for a predetermined period of time on the scene-searching bar, or when a first touch event is retained for a predetermined period of time on the enlarged scene-searching bar, information regarding a touch mode guideline for displaying an enlarged or reduced scene-searching bar.

2. The method of claim 1, further comprising:
   displaying, when the first touch event occurs in a state where the enlarged scene-searching bar is displayed, a further enlarged scene-searching bar that has a shorter time range than the time range of the enlarged scene-searching bar.

3. The method of claim 2, further comprising:
   displaying, when a second touch event occurs that differs from the first touch event, a reduced scene-searching bar that has a longer time range for searching for a scene in the video content than the time range of the scene-searching bar, the time range of the enlarged scene-searching bar, or the time range of the further enlarged scene-searching bar.

4. The method of claim 3, further comprising one of the following:
   returning, when a second touch event occurs that differs from the first touch event, the enlarged scene-searching bar to the scene-searching bar;
   returning, when a second touch event occurs that differs from the first touch event, the further enlarged scene-searching bar to the enlarged scene-searching bar; and
   returning, when a second touch event occurs that differs from the first touch event, the further enlarged scene-searching bar to the scene-searching bar.

5. The method of claim 3, further comprising:
   displaying a preview screen corresponding to the video reproducing start or end point in the enlarged scene-searching bar or the further enlarged scene-searching bar.

6. The method of claim 3, further comprising:
   reproducing, when a touch release event occurs on at least one of the scene-searching bar, the enlarged scene-searching bar, and the further enlarged scene-searching bar, the video content from the scene corresponding to a position on the bar where the touch release event occurred.

7. The method of claim 3, wherein the information regarding a touch mode guideline for displaying the enlarged or reduced scene-searching bar is displayed on a region near the position on the bar where the touch is retained.

8. The method of claim 3, wherein:
   the first touch event is created when a right drag gesture is performed and then a down drag gesture is performed on the searching bar; and
   the second touch event is created when a right drag gesture is performed and then an up drag gesture is performed on the searching bar.

9. The method of claim 1, wherein the displaying of a scene-searching bar comprises one of the following:
   displaying the scene-searching bar in a default mode when the video content is reproduced; and
   displaying the scene-searching bar according to an input signal or a touch event that the user creates.

10. The method of claim 2, wherein the enlarged scene-searching bar has the same length as the scene-searching bar.

11. The method of claim 3, wherein the further enlarged scene-searching bar has the same length as the enlarged scene-searching bar.

12. A mobile device comprising:
    an input unit, including a touch panel, for creating an input signal for reproducing video content;
    a display panel for displaying a scene-searching bar for searching for a particular scene in the video content; and
    a controller for displaying, when a first touch event occurs on the scene-searching bar displayed on the touch panel, an enlarged scene-searching bar that has the same length as the scene searching bar and a shorter time range for searching for a scene in the video content than the time range of the scene-searching bar, and for, when the first touch event is retained for a predetermined period of time on the scene-searching bar, or when a first touch event is retained for a predetermined period of time on the enlarged scene-searching bar, information regarding a touch mode guideline for displaying an enlarged or reduced scene-searching bar.

13. The mobile device of claim 12, wherein the controller removes, when the first touch event occurs in a state where the enlarged scene-searching bar is displayed, the enlarged scene-searching bar from the display panel, and displays, on the display panel, a further enlarged scene-searching bar that has the same length as the enlarged scene-searching bar and has a shorter time range than the time range of the enlarged scene-searching bar.

14. The mobile device of claim 13, wherein the controller removes, when a second touch event occurs that differs from the first touch event, a scene-searching bar that has been displayed from the display panel, displays a reduced scene-searching bar that has a longer time range for searching for a scene in the video content than the time range of the scene-searching bar, the time range of the enlarged scene-searching bar, or the time range of the further enlarged scene-searching bar, and that has a length equal to or shorter than that of the scene-searching bar, and one of returns the enlarged scene-searching bar to the scene-searching bar, returns, when a second touch event occurs that differs from the first touch event, the further enlarged scene-searching bar to the enlarged scene-searching bar, and returns, when a second touch event occurs that differs from the first touch event, the further enlarged scene-searching bar to the scene-searching bar.

15. The mobile device of claim 14, wherein the display panel displays a preview screen corresponding to the video reproducing start or end point in the enlarged scene-searching bar or the further enlarged scene-searching bar.

16. The mobile device of claim 14, wherein the controller reproduces, when a touch release event occurs on at least one of the scene-searching bar, the enlarged scene-searching bar, and the further enlarged scene-searching bar, the video content from the scene corresponding to a position on the bar where the touch release event occurred.

17. The mobile device of claim 14, wherein the information regarding a touch mode guideline for displaying the enlarged or reduced scene-searching bar is displayed on a region near the position on the bar where the touch is retained.

18. The mobile device of claim 14, wherein the first touch event is created when a right drag gesture is performed and then a down drag gesture is performed on the searching bar, and the second touch event is created when a right drag gesture is performed and then an up drag gesture is performed on the searching bar.

19. The mobile device of claim 12, wherein the display panel displays the scene-searching bar in a default mode when the video content is reproduced or the scene-searching bar according to an input signal or a touch event that the user creates.

* * * * *